(12) United States Patent
Nugent (10) Patent No.: US 6,212,967 B1
(45) Date of Patent: Apr. 10, 2001

(54) VARIABLE GEAR ASSEMBLY AND METHOD

(76) Inventor: James G. Nugent, 299 S. Great Rd., Lincoln, MA (US) 01773-4304

( * ) Notice: Subject to any disclaimer, the term of this patent is extended or adjusted under 35 U.S.C. 154(b) by 0 days.

(21) Appl. No.: 09/017,003

(22) Filed: Feb. 2, 1998

(51) Int. Cl.[7] .................................................. F16H 55/17
(52) U.S. Cl. .................................. 74/437; 74/415; 74/460
(58) Field of Search .............................. 74/415, 437, 460, 74/435, 436, 393; 474/72, 141

(56) References Cited

U.S. PATENT DOCUMENTS

| | | | |
|---|---|---|---|
| 3,818,747 | * | 6/1974 | Van Riemsdijk ....................... 74/436 |
| 4,416,165 | * | 11/1983 | Kramer et al. ..................... 74/436 X |
| 4,685,348 | | 8/1987 | Takami . |
| 4,765,195 | | 8/1988 | Takami . |
| 5,247,847 | | 9/1993 | Gu . |
| 5,381,766 | | 1/1995 | Sakita . |
| 5,405,300 | | 4/1995 | Sakita . |

FOREIGN PATENT DOCUMENTS 1566-124 * 5/1990 (SU) ........................................ 74/393

* cited by examiner

Primary Examiner—David A. Bucci
Assistant Examiner—Colby Hansen
(74) Attorney, Agent, or Firm—Brown, Martin, Haller & McClain, LLP (57) ABSTRACT

A variable gear assembly has a cam gear with a plurality of teeth of varying size and configuration, and a rotatably mounted roller gear has a plurality of rollers for meshing engagement with the teeth. The distance of each roller from the rotation axis and the angles between adjacent rollers are predetermined such that, at any time during a rotation cycle, two rollers engage at least one currently active tooth. The assembly provides a variable gear ratio.

23 Claims, 7 Drawing Sheets

VARIABLE GEAR ASSEMBLY AND METHOD

BACKGROUND OF THE INVENTION

The present invention relates generally to transmission gear assemblies, and is particularly concerned with a variable gear assembly for producing a variable transmission ratio.

Gear assemblies are known which have a constant angular velocity or transmission ratio for transmitting power from one shaft to another shaft. These gear assemblies have two gears of constant diameter which are in meshing engagement via teeth or the like. U.S. Pat. No. 5,247,847 of Gu describes a cam gear assembly in which a cam gear of a first, constant diameter has a series of teeth defining a lobular periphery and a roller gear of a second, constant diameter is in meshing engagement with the cam gear. Both gears are of constant diameter. The roller gear has a plurality of rotatably mounted rollers around its perimeter for meshing engagement with the gear teeth, and the second diameter is smaller than the first diameter. This provides a constant angular velocity ratio. The provision of a roller gear instead of mating conventional gears with meshing teeth reduces the risk of damage to the gear teeth and possible failure of the transmission.

Variable ratio gear transmissions employ at least one pair of non-circular gears to provide a continuously variable transmission ratio. One such variable gear arrangement is described in U.S. Pat. No. 4,685,348 of Takami. At least one pair of non-circular gears have intermeshing gear teeth to produce a continuously variable transmission. U.S. Pat. Nos. 5,381,766 and 5,405,300 of Sakita describe a rotary piston engine in which piston assemblies are connected to the engine output shaft through non-circular gear sets. Each non-circular gear set includes a heart shaped gear and a teardrop shaped gear with intermeshing teeth. The teeth on the teardrop shaped gear may be replaced with rollers. However, this gear has a relatively large number of rollers and the engagement of the rollers in the recesses between adjacent teeth may give rise to some instability.

SUMMARY OF THE INVENTION

It is an object of the present invention to provide a new and improved variable assembly.

According to one aspect of the present invention, a variable gear assembly is provided which comprises a first, roller gear having a plurality of rotatable rollers and rotatable about a first rotation axis, each roller being at a predetermined distance from the first rotation axis, and a second, cam gear having a plurality of teeth for engagement with the rollers as the roller gear rotates, each tooth having opposing first and second sides, and an apex between the first and second sides, and the arrangement being such that, as the roller gear rotates through a cycle of 360°, the rollers engage successive active teeth along the second cam gear, and a pair of adjacent rollers engage at least one active tooth at any time during a complete cycle of said roller gear, the roller gear and cam gear being arranged to provide mechanical communication at a variable angular velocity ratio.

In a preferred embodiment of the invention, at least the roller gear is of variable diameter. The cam gear may also be rotatable about a second rotation axis and be of variable diameter. The rollers are preferably at variable angular spacings from each other and at varying distances from the roller gear rotation axis. The roller gear may engage the outer periphery of the cam gear, or the cam gear may be a ring gear with teeth on its inner periphery. A single pair of opposing gears may be provided, or two or more stacked pairs of gears may be used. The cam gear may be a rack with spaced teeth, with the roller gear comprising a pinion for rotatable engagement with the teeth on the rack, the rack or the roller gear moving in a linear direction as the roller gear rotates, for converting rotational motion to linear motion, or vice versa.

In one embodiment of the invention, each tooth on the cam gear is relatively large as compared to the varying radius of the cam gear, and a relatively small number of cam gear teeth are provided, which may be of varying sizes.

A large number of different variable gear relationships may be provided using this arrangement, and the arrangement permits use of the entire range of motion of the gears. The arrangement is also such that there is no slack between the gears, regardless of their relative position, and the variable gear assembly is smoother in operation than previous variable transmission arrangements.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
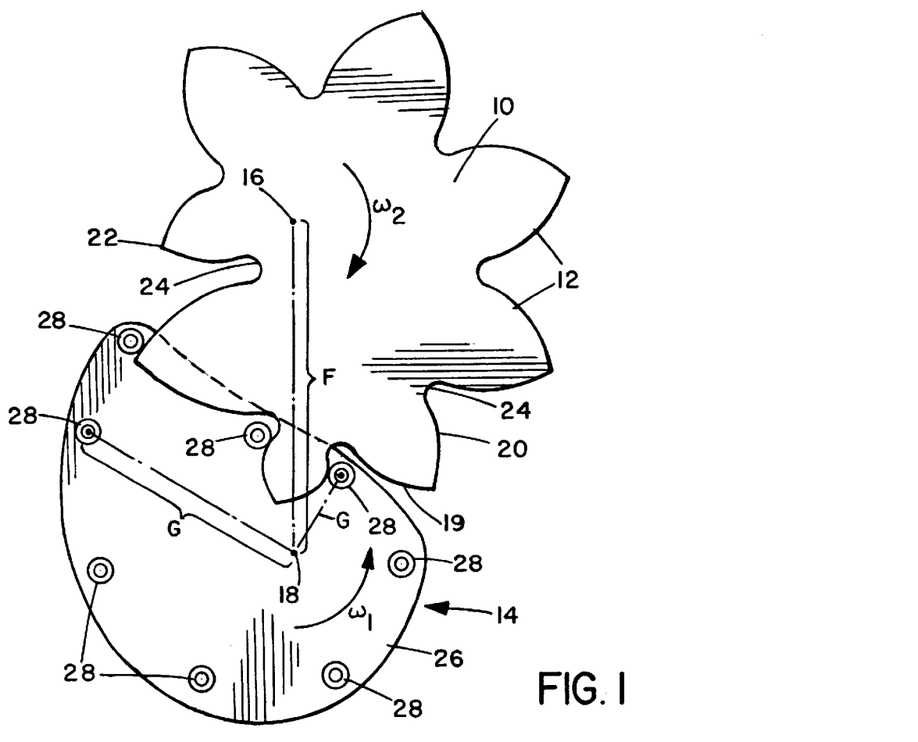
FIG. 1 is a plan view of a variable gear assembly according to a first embodiment of the invention.
Figure 2:
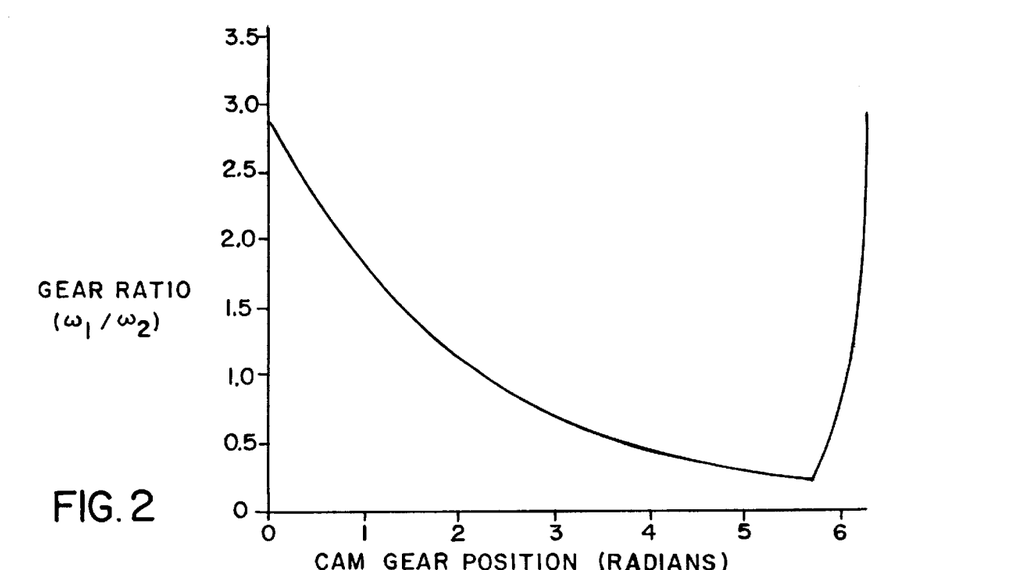
FIG. 2 is a graph indicating the gear ratio of the embodiment of FIG. 1.

FIG. 1 of the drawings illustrates a variable gear assembly according to a first embodiment of the present invention, while FIG. 2 illustrates the gear ratio provided by the gear assembly. The gear assembly comprises a cam gear 10 having a plurality of teeth 12 of varying sizes and a roller gear 14 in meshing engagement with the cam gear. The cam gear 10 is rigidly secured to a first shaft 16 rotatable about its longitudinal axis, while the roller gear is rigidly secured to a second shaft 18 rotatable about its longitudinal axis in the opposite direction to cam gear 10, as indicated by the arrows in FIG. 1. Either the shaft 16 or the shaft 18 may be the input or driving shaft, with the other shaft being the output or driven shaft. The roller gear rotates at a first, varying angular velocity $\omega_1$ while the cam gear rotates at a second, varying angular velocity $\omega_2$. One full rotation of one of the gears may correspond to one or more rotations of the other gear. In the illustrated embodiment, one full 360° rotation of the cam gear corresponds to a full 360° rotation of the roller gear.

The cam gear 10 is of continuously varying diameter, with the teeth 12 being generally lobular or leaf-shaped and of varying dimensions. Each tooth 12 has opposite first and second sides 19, 20 in the direction of motion, and an apex 22. A notch 24 is defined between each adjacent pair of teeth. In the embodiment of FIG. 1, a total of eight teeth 12 are provided, although a greater or lesser number of teeth may be provided in alternative embodiments. It can be seen that each tooth has opposite, smoothly curving sides or edges 19, 20.

The roller gear 14 has a base or support 26 and a plurality of rollers 28 rotatably mounted at unevenly spaced intervals about the support 26, at varying distances G from the rotation axis 18 of the support and at varying angles $\phi$ to one another. In the illustrated embodiment, the rollers are rotatably mounted on a rotatable support plate or disc 26. However, other alternative rotatable mountings for the rollers may be provided, for example each roller may be rotatably mounted on the end of an arm, with the opposite end of the arm being rotatably mounted on axis 18.

Figure 3:
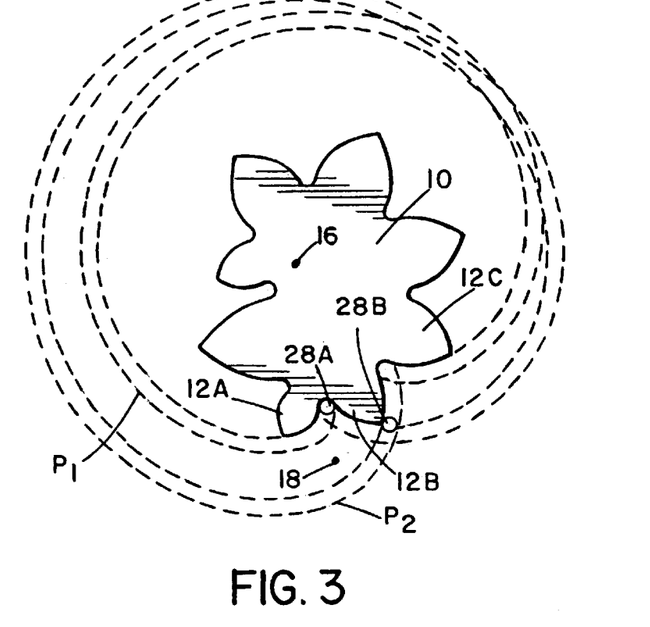
FIG. 3 is a plan view of the cam gear of FIG. 1 with the paths of two adjacent rollers of the roller gear illustrated schematically.
Figure 4:
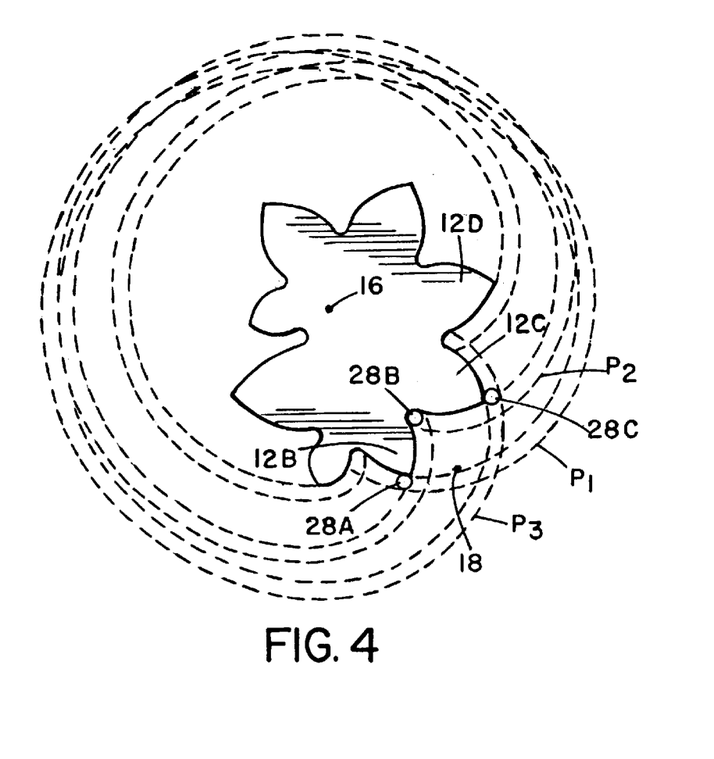
FIG. 4 is a plan view similar to FIG. 3 illustrating a successive point in the motion where a third roller contacts the cam gear, with the paths of three adjacent rollers illustrated schematically.

As illustrated in FIG. 1, the rollers are positioned for meshing engagement with successive teeth 12 of the cam gear as the cam and roller gears rotate. The arrangement is preferably such that the spacing between the rotation axes 16,18 remains constant, and such that, at any one position during the rotation, one roller engages one side of the currently active tooth while an adjacent roller engages the opposite side of the tooth, and a roller does not move away from the cam gear until a further roller has contacted the next tooth, as best indicated in FIGS. 3 and 4. This helps to ensure smooth and stable operation of the variable gear assembly.

FIG. 3 schematically illustrates the rotation paths $P_1$ and $P_2$ of two adjacent rollers 28A and 28B of the roller gear relative to the cam gear 10, assuming that the roller gear were free to rotate around the periphery of the cam gear. This relationship is determined by first selecting the relative angular positions of the respective rollers. In the solid line position of the rollers 28A and 28B, it can be seen that roller 28A is engaging the notch 24 between two adjacent teeth 12A and 12B, while roller 28B is adjacent the apex of tooth 12B on the opposite side to roller 28A. A successive position of roller 28B when it engages the notch between tooth 12B and the next tooth 12C is illustrated in FIG. 4. At this point, the roller 28A will be just about to leave the tooth 12B. A third roller 28C will then move in to contact the opposite face of tooth 12C to roller 28B. This roller then moves to the next notch 24, between tooth 12C and the next tooth 12D, while another roller (not illustrated) moves in to contact with the other side of tooth 12D before roller 28B leaves tooth 12C. Thus, the arrangement is such that, at any one time, two rollers are in contact with opposite sides of a tooth. This can be achieved by trial and error, using a computer to plot the paths of teeth in various relative positions until a configuration is achieved which meets this requirement. The finished plot will provide a suitable shape for the cam gear at the intersections of the various roller paths.

Figure 5:
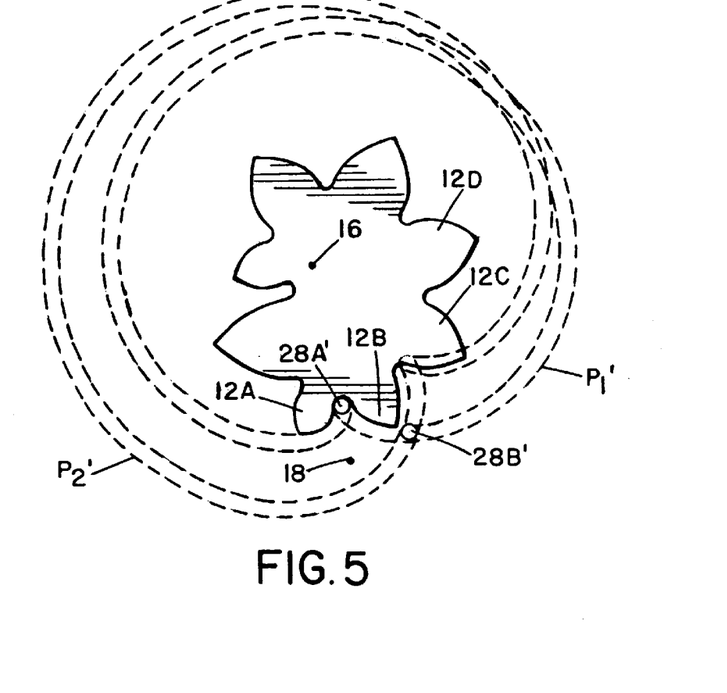
FIG. 5 is a plan view similar to FIG. 3, but illustrating a modified roller arrangement in which two adjacent rollers are spaced too far apart for proper operation of the assembly.
Figure 6:
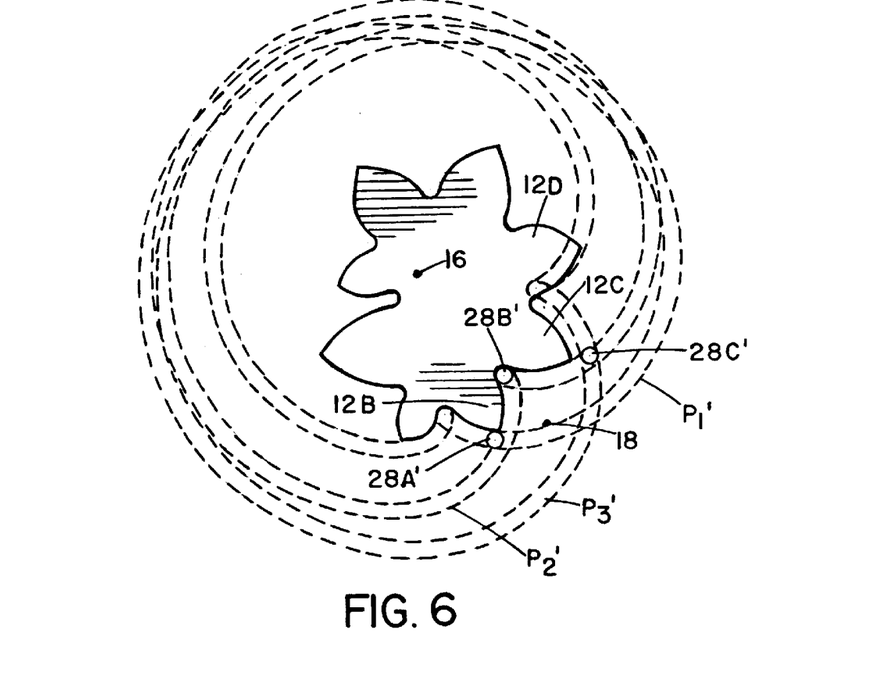
FIG. 6 is a plan view similar to FIG. 4 but illustrating a modified roller arrangement in which the three rollers are spaced too far apart.

The process may be better understood with reference to FIGS. 5 and 6, which illustrate an arrangement similar to FIGS. 3 and 4 but where the rollers have been spaced too far apart to ensure that two rollers always contact a tooth. If rollers 28A' and 28B' are spaced as in FIG. 5, with paths $P_1'$ and $P_2'$, respectively, the roller 28B' will have left tooth 12B by the time that roller 28A' reaches the notch 24 between adjacent rollers 12A and 12B, so the transmission will be unstable.

Similarly, as illustrated in FIG. 3, if rollers 28B' and 28C' are positioned too far apart, the path $P_3'$ of roller 28C' will not mesh properly with tooth 12C, and the roller 28C' will not contact tooth 12C before the first roller 28A' leaves tooth 12B. Thus, the spacing and relative positions of the rollers 28 are critical in ensuring proper gear operation.

From FIGS. 3 and 4, it can be seen that each roller sweeps through a predetermined path P as the roller gear rotates, the path P having an indent corresponding to the travel of the roller down one side of one tooth into a notch 24, and then up the other side of the next adjacent tooth, with the curvature of the path P corresponding to the curvature of the respective tooth faces engaged by the roller.

Figure 14:
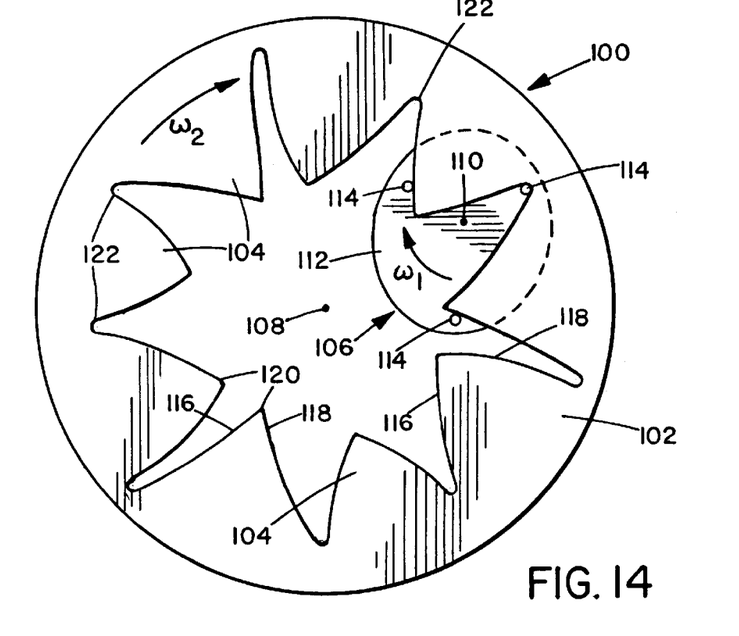
FIG. 14 is a plan view illustrating a variable ring gear assembly according to another embodiment of the invention.

The x and y coordinate position of the center of a roller may be given by:

$$x_c(\theta) := F \cdot \cos(\theta) - w \cdot G \cdot \cos\left[\theta + w \cdot \left(\int_o^\theta a(t)dt + \phi\right)\right] \quad (1)$$

$$y_c(\theta) := F \cdot \sin(\theta) - w \cdot G \cdot \sin\left[\theta + w \cdot \left(\int_o^\theta a(t)dt + \phi\right)\right] \quad (2)$$

where F is the distance between rotation axes 16, 18, G is the length of the "arm" connecting rotating shaft 18 to the roller, the angle of F is $\theta$ and the angle of arm G (or phase of the roller) is $\phi$, and the arm G rotates about F as a function of the angle $\theta$, described by $a(\theta)$. The constant w in equations 1 and 2 above is +1 for a roller gear as in FIG. 1, and −1 in the case of a ring gear (see embodiment of FIG. 14).

The phase or angular position of each roller and the distance G of the roller from the axis of rotation is chosen such that there is no backlash between the roller gear and the cam gear. This may be achieved as illustrated in FIGS. 3 and 4, by placing the rollers close enough together such that when one roller is at the closest point to the cam gear axis, the other is still contacting the tooth between them. The process is continued until one revolution for either the roller gear or the cam gear is achieved, which may correspond to one or more revolutions of the other gear.

Although the separation F between the rotation axes 16, 18 may be fixed as described above in connection with FIGS. 1 and 2, one or both axes may be movable if required, depending on the particular application. For example, either the cam gear or the roller gear may be mounted on a moveable arm.

In the embodiment of FIG. 1, one revolution of the cam gear corresponds to one complete revolution of the roller gear. Each roller has a radius substantially less than the length of a side of the corresponding cam gear tooth 12, such that a roller will rotate more than one complete revolution while traveling down the side of one tooth and back up the side of the next adjacent tooth. This helps to ensure smooth operation of the gear assembly. The arrangement is designed to maintain at least two rollers in engagement with the gear teeth at all times and provides a smooth transition from one tooth to the next, as indicated in FIGS. 3 and 4. FIG. 2 illustrates the variation in the gear ratio of the assembly of FIG. 1 with cam gear position. The gear assembly of FIG. 1 therefore provides a smoothly varying gear ratio.

Figure 7:
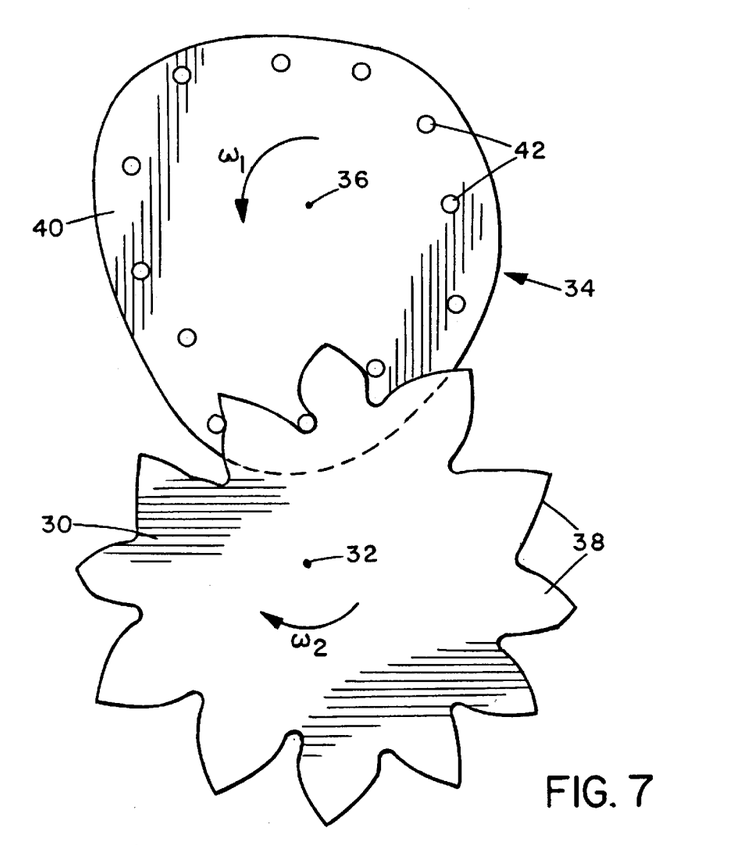
FIG. 7 is a plan view of a variable gear assembly according to a second embodiment of the invention.
Figure 8:
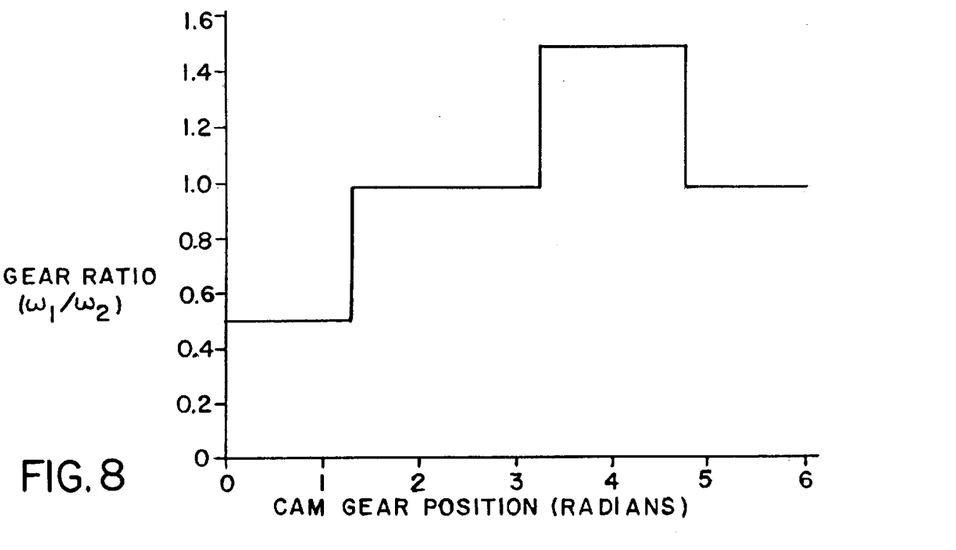
FIG. 8 is a graph indicating the gear ratio of the embodiment of FIG. 7.

FIG. 7 illustrates a variable gear assembly according to a second embodiment of the invention, which is arranged to provide a random stepped gear ratio, as indicated in FIG. 8. As in the first embodiment, the gear assembly comprises a cam gear 30 mounted on a rotatable shaft 32 and in meshing engagement with a roller gear 34 mounted on a rotatable shaft 36. FIG. 8 illustrates the gear ratio of the assembly of FIG. 7. As illustrated, the assembly of FIG. 7 provides a stepped gear ratio rather than a continuously varying gear ratio as in the first embodiment.

The cam gear 30 has a series of spaced, asymmetrical teeth 38 and the roller gear 34 comprises a rotatable base 40 on which a series of spaced rollers 42 are rotatably mounted at varying distances from the axis of rotation defined by shaft 36. As in the previous embodiment, roller paths may be plotted to determine the optimum shape and positions of teeth 38 to ensure that two adjacent rollers will always contact the opposite sides of a currently active tooth. In this embodiment, one complete rotation of cam gear 30 corresponds to one rotation of roller gear 34. There are 12 teeth and rollers in this embodiment, and each roller is of smaller dimensions than the tooth it contacts, so that several rotations of the roller are required to travel down one side of one tooth and up the opposing side of the next adjacent tooth.

Figure 9:
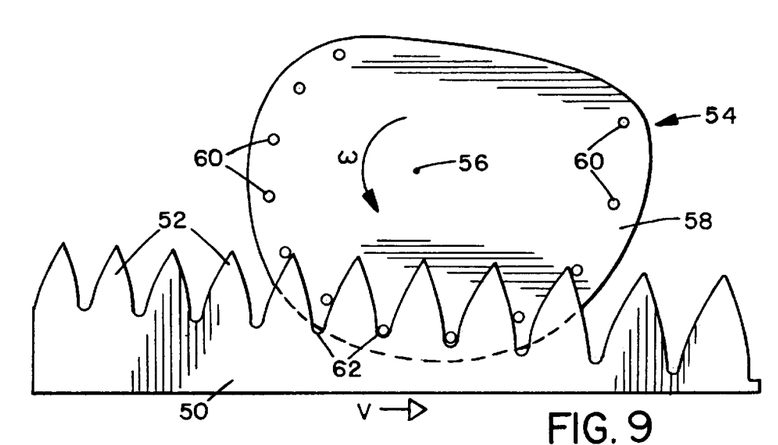
FIG. 9 is a plan view of a variable rack and pinion gear assembly according to a third embodiment of the invention.
Figure 10:
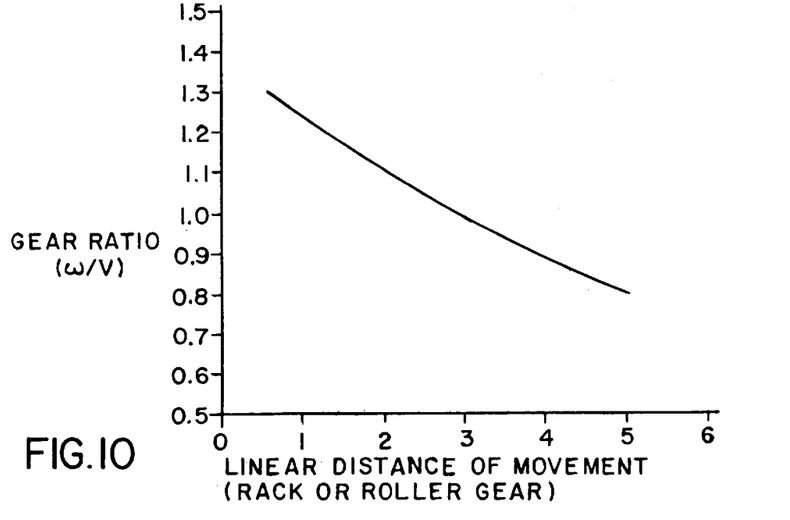
FIG. 10 is a graph indicating the gear ratio of the embodiment of FIG. 9.

FIGS. 9 and 10 illustrate another embodiment of the invention in which a variable ratio rack and pinion gear assembly is provided. In this embodiment, a rack 50 has a series of teeth 52 of progressively increasing size. A roller or pinion gear 54 is rotatably mounted on axle 56 for meshing engagement with teeth 52. The arrangement may be such that the rack shifts axially with rotation of the gear 54 along the rack, or the rack may be fixed and the roller axle may translate along the rack, depending on the application, with the linear velocity produced being equal to v, where the angular velocity of the roller gear is ω.

As in the previous embodiments, the roller gear 54 comprises a suitable support such as base plate 58 and a series of small rollers 60 rotatably mounted at varying intervals on base plate 58 and at varying distances from rotation axis 56, in order to achieve the desired gear ratio illustrated in FIG. 10. The arrangement is such that at least one roller will be acting in the forward direction and at least one roller will be acting in the opposite direction at all times, and the transmission will be smooth and stable. The dimensions of each roller are considerably smaller than the tooth dimensions, and several revolutions are required for a roller to travel down one side of one tooth, into the notch 62 between adjacent teeth, and then up the other side of the next tooth.

FIG. 10 illustrates the smoothly reducing gear ratio produced with the rack and pinion gear as illustrated in FIG. 9.

Figure 11:
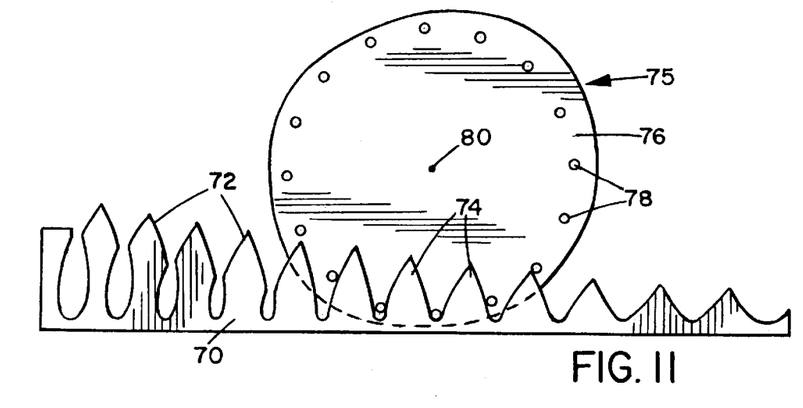
FIG. 11 is a plan view of a modified variable rack and pinion gear assembly.
Figure 12:
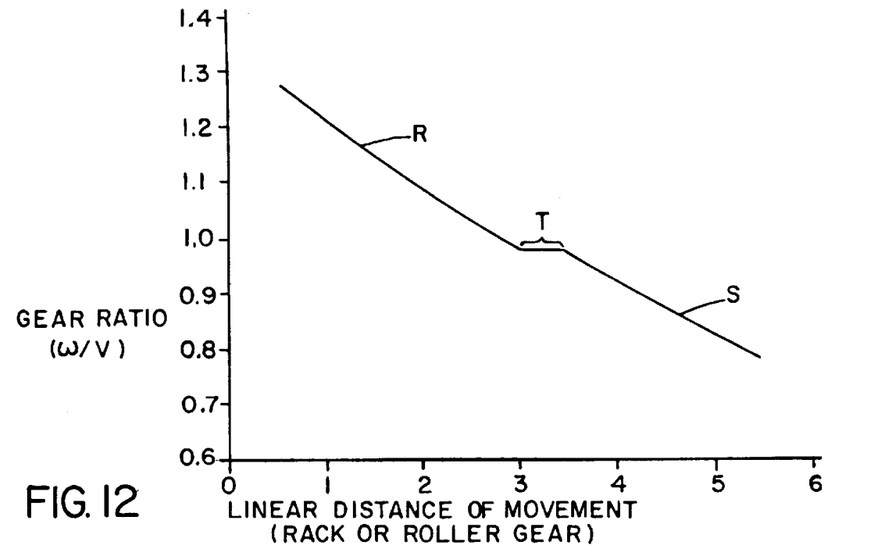
FIG. 12 is a graph illustrating the gear ratio of the assembly of FIG. 11.

FIGS. 11 and 12 illustrate another embodiment of a rack and pinion gear assembly. In this embodiment, a rack 70 has a series of teeth 72 of varying shape, and two teeth 74 at the center of the rack of the same shape and dimensions. A constant radius roller gear 75 engages the rack. As illustrated, roller gear 75 comprises a mounting plate or disc 76 on which a series of rollers 78 are rotatably mounted at fixed spacings and distance from the axis of rotation 80. As illustrated in FIG. 12, the arrangement of FIG. 11 produces two sections R and S of reducing gear ratio, separated by a section T of constant gear ratio. Either the cam gear or the roller gear may also be of constant diameter in the previous embodiments, with suitable adjustment in the shape and dimensions of the other, non-uniform gear.

The embodiment of FIGS. 11 and 12 has the advantage that it does not matter which roller contacts a particular tooth, and fractional turns are therefore possible. Most variable gears require a whole number relationship between the gear turns for one complete cycle. Although a gear assembly where operation is independent of tooth position is shown for a rack and pinion gear in FIG. 11, the same effect may be achieved in the cam gear embodiments. For example, in FIG. 7, rollers 42 may be at a fixed, constant radius from rotation axis 36, and the teeth 38 may be modified to correspond to teeth 72 of the rack 70. In this case, one complete revolution of one of the gears may correspond to a number of revolutions including a fractional revolution of the other gear. This arrangement may also be provided in a ring gear or stacked gear assembly.

Figure 13:
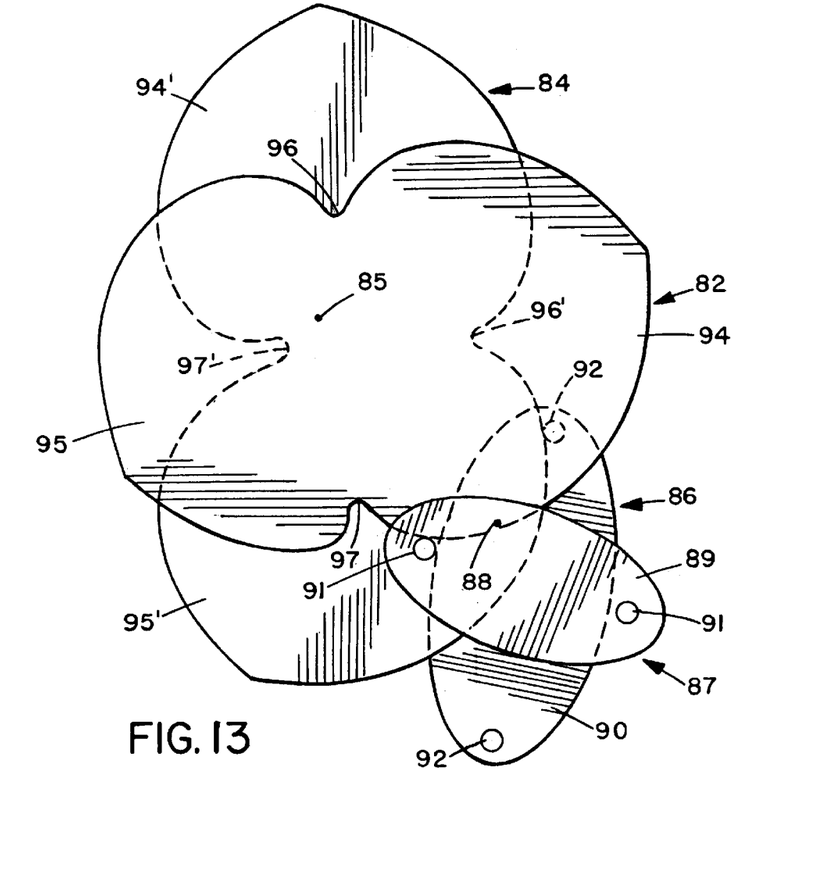
FIG. 13 is a plan view illustrating a double set of stacked gears according to another embodiment of the invention.

FIG. 13 illustrates another alternative embodiment in which a double gear wheel stack replaces the single cam gear and roller gear pair of FIG. 1. This arrangement is designed to have the same gear ratio as the embodiment of FIG. 1, i.e. the gear ratio as illustrated in FIG. 2. The assembly of FIG. 13 comprises a pair of cam gears 82,84 mounted in a parallel, vertically spaced relationship and both mounted on the same rotating shaft 85, and a pair of roller gears 86,87 mounted in the same planes as the cam gears 84,82, respectively, for meshing engagement with the respective cam gears. The roller gears 86,87 are both mounted on the same rotating shaft 88. Two or more layers of cam gears and roller gears may be used as necessary in order to produce a finer or larger gear ratio, which may be required for some applications.

Each roller gear 86,87 comprises a rotating support plate 90,89 respectively and two spaced rollers 92,91, respectively, rotatably mounted at diametrically opposite positions on the support plate. Each cam gear 82,84 comprises a pair of diametrically opposed, asymmetrical lobes 94,95 and 94',95', respectively separated by opposing indents or notches 96,97 and 96',97'. At any one time, at least two of the four rollers 91,92 engages a cam gear. In some positions three or four rollers 91 and 92 will engage the cam gears.

Figure 15:
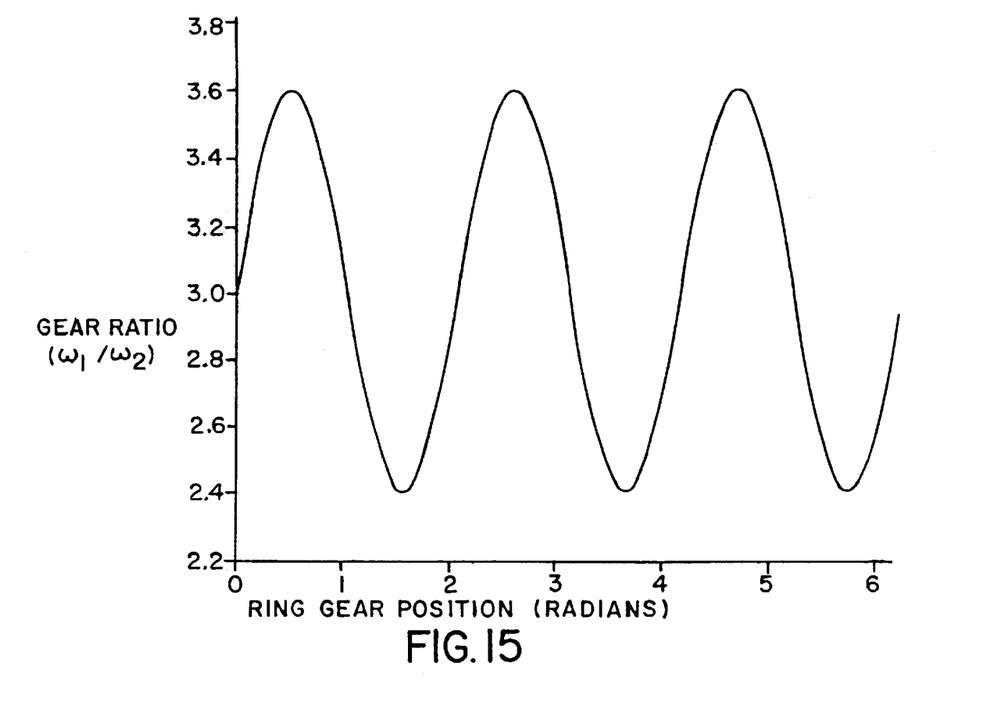
FIG. 15 is a graph illustrating the gear ratio of the assembly of FIG. 14.

FIGS. 14 and 15 illustrate an alternative, ring gear assembly 100 and the gear ratio for this assembly, respectively. The assembly 100 comprises a ring gear 102 having a plurality of inwardly directed teeth 104 in a generally star-like, asymmetrical arrangement, and a roller gear 106 in meshing engagement with teeth 104. The ring gear is mounted on a shaft 108 for rotation about a first axis while the roller gear 106 is mounted on a shaft 110 for rotation about a second axis. Roller gear 106 comprises a suitable support such as support plate 112 and three rollers 114 rotatably mounted at spaced positions around the plate 112.

The ring and roller gears rotate in the same direction at varying angular velocities $\omega_1$, and $\omega_2$ respectively, with one of the shafts 108,110 comprising an input shaft and the other comprising an output shaft, and the output angular velocity varying according to the gear ratio graph of FIG. 15. It can be seen that the gear ratio continuously varies in a generally sinusoidal manner in this embodiment.

As the gears rotate relative to one another, the rollers travel along the teeth 104. Each tooth 104 has opposite sides 116,118 and an apex 120. A recess or notch 122 is defined between adjacent teeth. The teeth are of varying, generally triangular shapes and sizes. FIG. 14 illustrates a position in which a central one of the rollers 114 is engaging the notch 122 between two adjacent teeth, one of the outer rollers 114 engages the opposite face of one of the teeth, and the other outer roller engages the opposite face of the other tooth, ensuring a smooth and stable transmission. The spacing and phase angles between the rollers are arranged such that at least two rollers are in contact with the teeth at any time in the rotation. The ring gear has nine teeth, and three full rotations of the roller gear are required for one complete rotation of the ring gear.

In each of the embodiments, the rollers of the roller gear are of constant diameter. However, rollers of different diameter may be provided in alternative embodiments. For example, larger rollers may be positioned to provide increased mechanical strength in some areas, if required.

It can be seen that the variable gear assembly as described in the various embodiments above is extremely versatile and may be modified readily to provide a large number of different gear ratios as required for numerous applications. Unlike prior art cam gear or rack and roller gear arrangements, a continuously variable, stepped, or other variable gear ratio can be provided over the entire rotation of the gears and with a continuous, reliable gear function. In each case, the rollers are positioned close enough together that at least two rollers are acting on a tooth of a cam gear, rack, or ring gear at any one time. In the case of stacked cam gear roller gear pairs, at least one roller is acting on each cam gear at any one time. The angular and radial placement of the rollers may be selected such that there is no slack in the transmission, simply by arranging the gear assembly so that two rollers are in contact with the opposing gear teeth at all times during a cycle. This provides a much smoother operating variable gear than was possible in past arrangements, due to the use of rollers for one of the gears and the careful positioning of the rollers such that two rollers contact the opposing gear at all times.

Although a preferred embodiment of the invention has been described above by way of example only, it will be understood by those skilled in the field that modifications may be made to the disclosed embodiment without departing form the scope of the invention, which is defined by the appended claims.

I claim:

1. A variable gear assembly, comprising:
    a first, roller gear having a plurality of rotatable rollers and rotatable about a first rotation axis, each of said rollers being at a predetermined distance from said first rotation axis;
    a single second cam gear interacting with said first, roller gear in a single plane, the cam gear having a plurality of teeth for engagement with said rollers as said roller gear rotates, said teeth having a first side, a second side, and an apex between said first and second side, and being of predetermined shape and dimensions;
    at least one of said gears having a variable diameter;
    the arrangement being such that, as said roller gear rotates through a cycle of 360 degrees, said rollers engage successive active teeth along said single cam gear, and at least one of said rollers maintains mechanical communication with said cam gear in the direction of rotation and at least one of said rollers maintains mechanical communication with said cam gear in a direction opposite to the direction of rotation at all times during a complete cycle of said roller gear;
    said roller gear and said cam gear being arranged to provide mechanical communication at a variable gear ratio; and
    each roller of said roller gear having a predetermined circumference and contacting said cam gear profile along a predetermined distance greater than the circumference of said roller, whereby each roller of said roller gear rolls along the cam gear profile for a distance greater than the circumference of said roller.

2. The assembly as claimed in claim 1, wherein a pair of adjacent rollers engage opposite sides of a respective active tooth at any time during a complete cycle.

3. The assembly as claimed in claim 1, wherein the roller gear is of variable diameter and the distances between the rollers and the rotation axis are of varying length.

4. The assembly as claimed in claim 1, wherein the cam gear is rotatable about a second rotation axis.

5. The assembly as claimed in claim 4, wherein the cam gear teeth are of varying shapes and dimensions.

6. The assembly as claimed in claim 1, wherein the cam gear comprises a rack and the rack and roller gear together comprising means for conversion between rotational movement and translational movement.

7. The assembly as claimed in claim 1, wherein the cam gear comprises a ring gear.

8. The assembly as claimed in claim 1, wherein each roller is at a predetermined angular spacing to the next adjacent roller on each side, and at least some of the angular spacings are different from one another.

9. The assembly as claimed in claim 1, wherein the gear ratio is continuously varying.

10. The assembly as claimed in claim 1, wherein the cam and roller gears are arranged to provide a stepped gear ratio.

11. A variable gear assembly, comprising:
    a first, roller gear having a plurality of rotatable rollers and rotatable about a first rotation axis, each of said rollers being at a predetermined distance from said first rotation axis;
    a second cam gear having a plurality of teeth for engagement with said rollers as said roller gear rotates, each tooth having a first side, a second side, and an apex between said first and second side, and being of predetermined shape and dimensions;
    at least one of said gears having a variable diameter;
    the arrangement being such that, as said roller gear rotates through a cycle of 360 degrees, said rollers engage successive active teeth along said second cam gear, and a pair of adjacent rollers engage at least one active tooth at any time during a complete cycle of said roller gear, the roller gear and cam gear being arranged to provide mechanical communication at a variable gear ratio; and
    the cam gear having notches between each adjacent pair of teeth, the sides and apex of each tooth and the notches together comprising cam surfaces over which the successive rollers travel as the roller gear rotates relative to the cam gear, and the arrangement of rollers and the shape and dimensions of the cam gear teeth being adapted such that the rollers contact successive active teeth around the periphery of the cam gear and each active tooth is engaged on opposite sides by two adjacent rollers until a roller engages the next successive active tooth.

12. A variable gear assembly comprising:
    a first, roller gear having a plurality of rotatable rollers and rotatable about a first rotation axis, each of said rollers being at a predetermined distance from said first rotation axis;

a second cam gear having a plurality of teeth for engagement with said rollers as said roller gear rotates, each tooth having a first side, a second side, and an apex between said first and second side, and being of predetermined shape and dimensions;

at least one of said gears having a variable diameter;

the arrangement being such that, as said roller gear rotates through a cycle of 360 degrees, said rollers engage successive active teeth along said second cam gear, and a pair of adjacent rollers engage at least one active tooth at any time during a complete cycle of said roller gear, the roller gear and cam gear being arranged to provide mechanical communication at a variable gear ratio;

each tooth being of generally Gothic-arc-like shape and each tooth having opposing curved, generally convex sides and a pointed apex.

13. The assembly as claimed in claim 12, wherein the teeth are of varying sizes.

14. The assembly as claimed in claim 12, wherein a concave notch is located between each adjacent pair of teeth.

15. The assembly as claimed in claim 12, wherein the cam gear is rotatable about a second rotation axis.

16. The assembly as claimed in claim 12, wherein the cam gear comprises a rack and the rack and roller gear together comprise means for conversion between rotational movement and translational movement.

17. The assembly as claimed in claim 12, wherein the cam gear comprises a ring gear.

18. The assembly as claimed in claim 12, wherein the cam gear comprises at least two cam gear members mounted in a vertically stacked, parallel relationship and linked for rotation about the same rotation axis, and the roller gear comprises at least two roller gear members mounted for meshing engagement with the respective cam gear members.

19. A variable gear assembly, comprising:

a first, roller gear having a plurality of rotatable rollers and rotatable about a first rotation axis, each of said rollers being at a predetermined distance from said first rotation axis;

a second cam gear having a plurality of teeth for engagement with said rollers as said roller gear rotates, each tooth having a first side, a second side, and an apex between said first and second side, and being of predetermined shape and dimensions;

at least one of said gears having a variable diameter;

the arrangement being such that, as said roller gear rotates through a cycle of 360 degrees, said rollers engage successive active teeth along said second cam gear, and a pair of adjacent rollers engage at least one active tooth at any time during a complete cycle of said roller gear, the roller gear and cam gear being arranged to provide mechanical communication at a variable gear ratio;

the sides and apex of each tooth comprising cam surfaces over which the successive rollers travel as the roller gear rotates relative to the cam gear, and the arrangement of rollers and the shape and dimensions of the cam gear teeth being adapted such that the rollers contact successive active teeth around the periphery of the cam gear and each active tooth is engaged on opposite sides by two adjacent rollers until a roller engages the next successive active tooth.

20. The assembly as claimed in claim 19, wherein the cam gear comprises at least two cam gear members mounted in a vertically stacked, parallel relationship and linked for rotation about the same rotation axis, and the roller gear comprises at least two roller gear members mounted for meshing engagement with the respective cam gear members.

21. The assembly as claimed in claim 19, wherein the cam gear is rotatable about a second rotation axis.

22. The assembly as claimed in claim 19, wherein the cam gear comprises a rack and the rack and roller gear together comprise means for conversion between rotational movement and translational movement.

23. The assembly as claimed in claim 19, wherein the cam gear comprises a ring gear.

* * * * *